US012791477B2

(12) United States Patent
Hoffstadt

(10) Patent No.: US 12,791,477 B2
(45) Date of Patent: Nov. 10, 2026

(54) METHOD FOR ESTIMATING A SPECTRAL REFLECTANCE VALUE TO BE EXPECTED OF A LAYER SYSTEM

(71) Applicant: GMG GmbH & Co. KG, Tübingen (DE)

(72) Inventor: Johannes Hoffstadt, Ulm (DE)

(73) Assignee: GMG GMBH & CO. KG, Tübingen (DE)

( * ) Notice: Subject to any disclaimer, the term of this patent is extended or adjusted under 35 U.S.C. 154(b) by 170 days.

(21) Appl. No.: 17/422,459

(22) PCT Filed: Jan. 10, 2020

(86) PCT No.: PCT/EP2020/050514
§ 371 (c)(1),
(2) Date: Jul. 13, 2021

(87) PCT Pub. No.: WO2020/148177
PCT Pub. Date: Jul. 23, 2020

(65) Prior Publication Data

US 2022/0091035 A1 Mar. 24, 2022

(30) Foreign Application Priority Data

Jan. 14, 2019 (EP) .................................... 19151569

(51) Int. Cl.
*G01N 21/55* (2014.01)
*G01N 21/17* (2006.01)
*G01N 21/59* (2006.01)

(52) U.S. Cl.
CPC ............ *G01N 21/55* (2013.01); *G01N 21/59* (2013.01); *G01N 2021/1742* (2013.01); *G01N 2021/1744* (2013.01); *G01N 2021/558* (2013.01)

(58) Field of Classification Search
CPC .... B41F 33/0036; G01N 21/55; G01N 21/59; G01N 2021/1742; G01N 2021/1744;
(Continued)

(56) References Cited

U.S. PATENT DOCUMENTS 5,933,578 A 8/1999 Van de Capelle et al.
6,483,607 B1 11/2002 Van de Capelle et al.
(Continued)

FOREIGN PATENT DOCUMENTS

CN 104 574 492 4/2015
DE 698 08 062 6/2004
(Continued)

OTHER PUBLICATIONS

Hebert, Mathieu: Optical models for color reproduction; Institut d'Optique Graduate School, Saint Etienne, France; Oct. 2013 (cited in international search report XP055676234).
(Continued)

*Primary Examiner* — Hina F Ayub
(74) *Attorney, Agent, or Firm* — Millen, White, Zelano & Branigan P.C.; Ryan R. Pool

(57) ABSTRACT

The aim of the invention is to provide a method for estimating a spectral reflectance value to be expected of a layer system consisting of a layer sequence of materials and printing inks that involves reliably predicting the appearance of the desired print. This aim is achieved according to the invention by providing a method for estimating a spectral reflectance value to be expected of a layer system consisting of a layer sequence of materials and printing inks, in which: a) firstly the values are determined for each individual layer in relation to i) the spectral transmission at the interfaces of the layer, ii) the spectral reflectance at the interfaces of the layer, iii) the spectral absorption in the layer volume, and iv) the spectral scattering in the layer volume; b) a resulting
(Continued)

reflectance value is ascertained from the determined values in relation to the layer sequence by following the various light paths in a sequential course through the layers.

5 Claims, 2 Drawing Sheets

(58) Field of Classification Search
CPC ...... G01N 2021/558; G01J 3/027; G01J 3/46; C09D 11/322; G01B 11/0625; G01B 11/24; G06T 15/06; H04N 1/603; H04N 1/6097
USPC .......... 356/301-326, 445-448, 402; 382/162
See application file for complete search history.

(56) References Cited

U.S. PATENT DOCUMENTS

| | | | |
|---|---|---|---|
| 7,199,903 B2 | 4/2007 | Van de Capelle et al. | |
| 9,347,874 B2 * | 5/2016 | Keydar | G01N 21/255 |
| 2002/0131770 A1 | 9/2002 | Meier et al. | |
| 2002/0193956 A1 | 12/2002 | Van de Capelle et al. | |
| 2013/0176615 A1 * | 7/2013 | Uefuji | G02B 1/113 359/359 |

FOREIGN PATENT DOCUMENTS

| | | |
|---|---|---|
| EP | 1 227 659 | 7/2002 |
| JP | 3416221 | 6/1995 |
| JP | 2012220335 A * | 11/2012 |

OTHER PUBLICATIONS

Donner, Craig et al.: Light Diffusion in Multi-Layered Translucent Materials; University of California San Diego, USA; Jul. 1, 2005.

* cited by examiner

METHOD FOR ESTIMATING A SPECTRAL REFLECTANCE VALUE TO BE EXPECTED OF A LAYER SYSTEM

The present invention relates to a method for estimating an expected spectra reflectance value of a layer system consisting of a layer sequence of materials and printing inks.

It is known to define so-called color spaces for given color systems, i.e., for example, in the case of a CMYK system, to determine in advance the different overprinting combinations in which the individual colors are varied between zero and 100% and are printed in layers on top of each other. It is also known to determine such color spaces for different printing systems or printing machines, digital printers and the like. Usually, the corresponding color combinations are printed and measured with a spectrometer.

It is also known to transfer corresponding color spaces and, for example, to incorporate the influences of printing carriers and the like.

In the packaging industry in particular, it is now common to use more than just three or four basic colors. On the contrary, a large number of colors are used and desired print images have to be printed and checked with regard to their actual appearance.

Based on the state of the art described above, the following invention is based on the task of providing a method for estimating an expected spectral reflectance value of a layer system consisting of a layer sequence of materials and printing inks, which makes a reliable prediction about the appearance of the desired print.

Such layer sequences of materials and printing inks usually comprise a printing substrate, for example paper, plastic film, aluminum foil and the like, printing inks applied thereon, and often an upper protective film cover. Alternatively, transparent films are also printed on the reverse side with a large number of colors, which also creates a protective effect for the ink layer, for example in packaging printing.

The greater the number of colors, the less clear the expected appearance. This is represented by the so-called spectral reflectance value.

SUMMARY OF THE INVENTION

As a technical solution of the aforementioned task, a method is proposed for estimating an expected spectral reflectance value to be expected of a layer system consisting of a layer sequence of materials and printing inks, wherein a) firstly, for each individual layer the values are determined for
   i) the spectral transmission at the interfaces of the layer,
   ii) the spectral reflectance at the interfaces of the layer,
   iii) the spectral absorption in the layer volume, and
   iv) the spectral scattering in the layer volume, b) a resulting reflectance value is ascertained from the determined values for the layer sequence by tracing the different light paths in a special path through the layers.

Further advantages and features result from the subclaims.

According to the invention, it is first determined for each individual layer which spectral transmission and reflection occurs at the interfaces, and how the light entering the layer volume is absorbed or scattered in each case. More precisely, according to optical laws, the behavior at the interface is described by the refractive index of the layer relative to that of the neighboring layer and the angle of the light beam to the interface, and absorption and scattering in the volume are caused, for example, by color pigments of an ink layer, but also by white pigments, fillers or even paper fibers of the print carrier layer.

The predetermined values are then used for the layer sequence by tracing the resulting spectral total reflectance value is then determined from the predetermined values for the layer sequence by tracking the different light paths in a sequential course through the layers.

Thus, it is assumed that a light beam incident at a certain angle on a layer known with respect to transmission, reflection, absorption, and scattering is split up in that a part is reflected back into the previous layer and the rest is allowed to enter. This entering portion is thereby refracted and split again inside the volume: into a portion that is partially absorbed, into a portion that is partially redirected by scattering, and the remainder that reaches the bottom edge of the layer. This certain portion meets there the next layer, for which then the same considerations are made, until a part of the light beam reaches the lowest layer.

According to an advantageous proposal of the invention, a white or a black carpet pad is positioned under the lowest layer for the purpose of the measurements.

If the measurement is carried out with a white carpet pad on the one hand and with a black carpet pad on the other hand, the defined reflection of the white carpet pad and the defined absorption of the black carpet pad respectively provide very specific meaningful values for the layer or layers above.

The light beam that has passed through the layers is reflected and travels in the same way from the lowest layer to the exit of the uppermost layer. This resulting reflection value then represents the value for the spectral appearance of the layer system to be assumed.

Because it is usually not possible to isolate the printed ink layers individually and then analyze them, they must be used in conjunction with the print substrate. Advantageously, one first determines the properties of the unprinted print substrate, which represents a single-layer system. Here, for transmission and reflection, the underlying refractive index can often be taken from the literature as a material constant; the absorption and scattering can be determined on the basis of spectral reflectance measurements of the carrier on known white and black substrates. In each case, these values are determined as a function of wavelength $\lambda$. For example, the literature value of the refractive index is 1.5 for the complexly constructed printing substrate paper.

Next, consider the two-layer system consisting of a printing substrate and a single ink. Because the parameters of the carrier layer are already known, now only the parameters of the ink layer have to be determined. Again, literature values are used for this purpose, if available, as well as spectral reflectance measurements. in an advantageous way, the parameters are determined iteratively, starting from estimated values, by using the estimated parameter values to calculate the total reflectance value of the two-layer system, comparing it with the measurement, and adjusting the parameters based on the deviations. This is done individually for each ink.

The common case in packaging printing is particularly simple, when a clear transparent film is used as the print substrate, which has practically no absorption or scattering. If a first ink layer is then used together with the film in a next step, the values of transmission and reflection, absorption and scattering in this color layer can be determined particularly easily.

In an advantageous way, enclosed air layers are taken into account in the same way (with refractive index 1, absorption and scattering 0), especially when placing foil prints on the measuring base. Alternatively, when placing on the measurement support, this air layer and thus its influence on the measurement can be removed or replaced by a filler substance in optical contact, such as clear oil with known refractive index, which is much closer to the refractive indices of foil and support and thus minimizes the additional reflections at interfaces.

For completely opaque substrates such as aluminum foil, the measurement substrate no longer matters. The measurements on white and black would not differ, therefore it is not possible to unambiguously determine the two parameters absorption and scattering from them. In this case, the division into absorption and scattering is irrelevant for the lowest (first-printed) ink layer because it has the same effect in the final result, and can be described completely by absorption without scattering, for example. Thus, one parameter is set to zero, and only one parameter remains to be determined from the one measurement.—However, the absorption and scattering of further ink layers is important in collotype printing, because scattering makes an overlying layer less transparent, i.e. partially opaque. Here, the principle must be continued analogously, i.e. these ink layers must be applied and measured on at least two different substrates, for example on the printing substrate without further ink and on the printing substrate with the lowest ink layer. The lowest ink layer is often a white or black printing ink, which makes the calculation easier. But in general, any lowest color can be used, as long as it represents a difference from the pure print carrier.

BRIEF DESCRIPTION OF THE DRAWINGS

Further advantages and features of the invention will be apparent from the following description with reference to the figures. Thereby showing.

DESCRIPTION OF PREFERRED EMBODIMENTS

Figure 1:
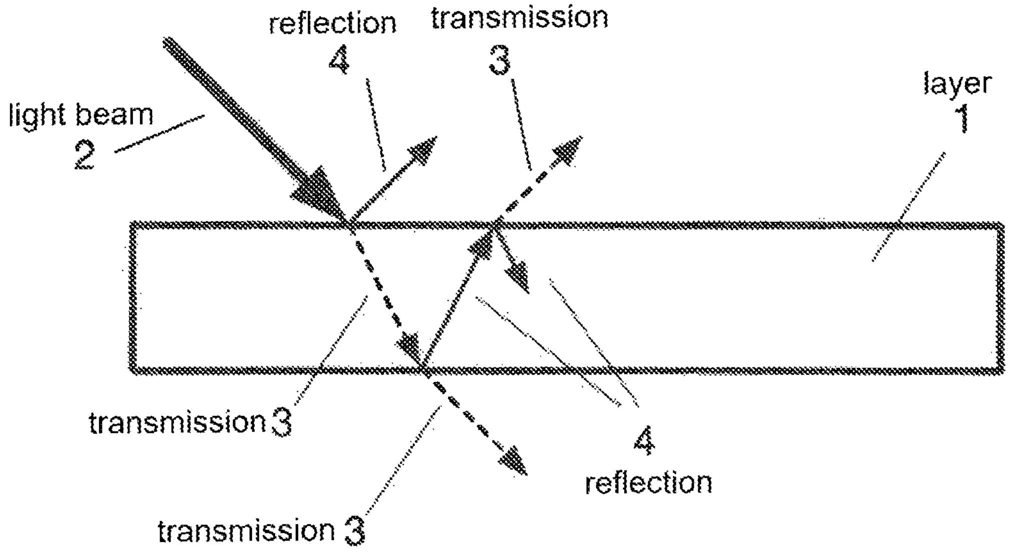
FIG. 1 a schematic representation of a layer to explain transmission and reflection.

According to FIG. 1, a light beam 2 of known wavelength A is sent into a layer 1 to be assumed. Reflections 4 take place at the boundary surfaces, remaining light components penetrate the layer and represent the transmission 3. At a possible substrate, the light beam is reflected and can thus experience a further reflection 4 of the layer and a residual transmission 3, which continues to emerge to the outside.

Figure 2:
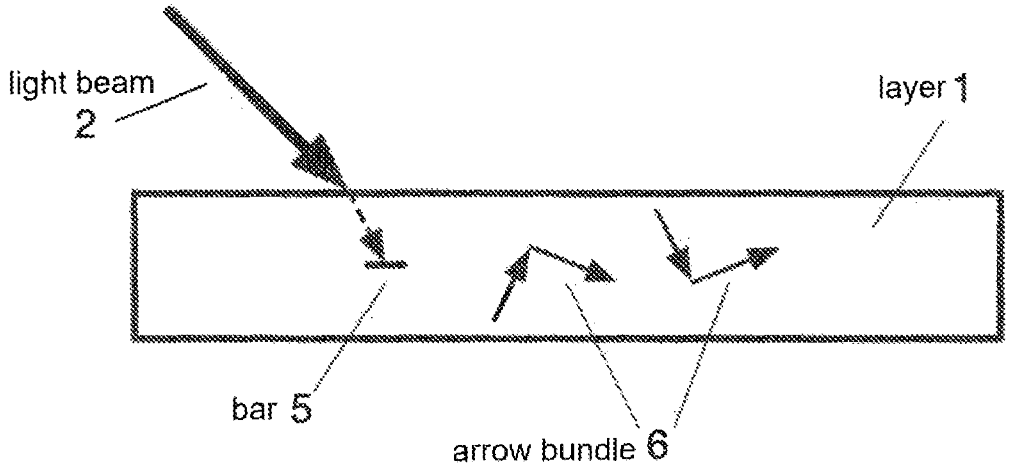
FIG. 2 an illustration according to FIG. 1 for explaining absorption and scattering and FIG. 3 a representation of a layer system for explaining the method according to the invention.

According to FIG. 2, a portion of the light 2 is absorbed in the layer 1 due to the printing ink or pigments, which is symbolized by the bar 5. A further portion is scattered within the layer in its volume by internal reflections, which is symbolized by the arrow bundle 6.

Figure 3:
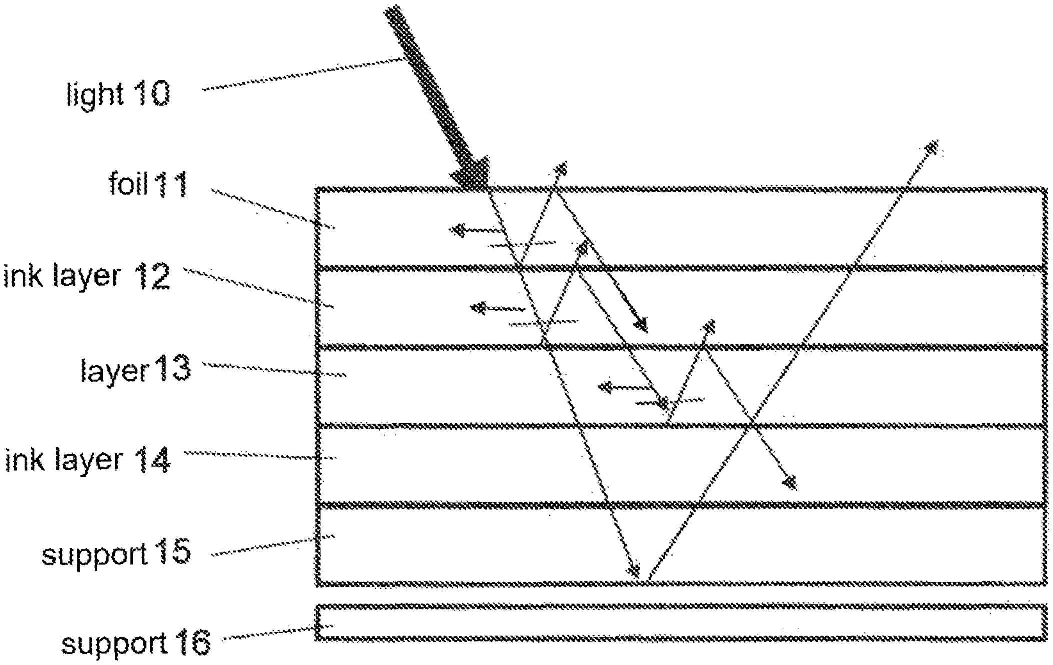

The interaction of all the above cases in a layer system is shown in FIG. 3. In the embodiment shown, a light beam 10 passes through layers 11, 12, 13, 14, 15 and strikes a measuring substrate 16.

The measuring substrate 16 is white or black.

In the embodiment example shown, the uppermost layer 11 is a film, layers 12 and 13 may be ink layers applied to an ink layer 14 by overprinting. By 15 is indicated, for example, a support, paper, foil, metallic foil, aluminum or the like. An air gap can be seen between 15 and support 16 as part of the layer system.

In each of the layers, transmissions, reflections, absorptions and scatterings take place as described above, which is indicated by the different arrows. The light beam 10 passes through the foil 11 and experiences reflections in the interfaces. The rest of the light enters the ink layer 12, where absorption, scattering, reflection take place and another rest of the light 10 enters the layer 13. This process repeats itself until the residual light is reflected at the white measuring substrate and the light beam traveling upward experiences the same reflections, absorptions and scatterings in each of the layers, so that finally a remaining part emerges.

After the behavior of each individual layer with respect to transmission, reflection, absorption and scattering has been predetermined, the resulting reflectance value can thus be determined using the method according to the invention.

REFERENCE CHARACTERS

1 layer
2 light beam
3 transmission
4 reflection
5 beam
6 arrow bundle
10 light beam
11 foil
12 layer
13 layer
14 layer
15 layer
16 measuring pad

What is claimed is:

1. Method comprising:

estimating an expected spectral reflectance value of a layer system, wherein the layer system consists of a layer sequence of materials and printing inks wherein said layer sequence comprises at least one material layer and at least two printing ink layers and an uppermost and bottommost layer, said estimating is achieved via a method comprising:

a) computing values for each individual material layer of the layer sequence with regard to the following:
   i) spectral transmission values at interfaces of the individual layer,
   ii) spectral reflectance values at the interfaces of the individual layer,
   iii) spectral absorption values in a layer volume of the individual layer, and
   iv) spectral scattering values in the layer volume of the individual layer, b) computing values for each individual printing ink layer of the layer sequence with regard to the following:
   i) spectral transmission values at interfaces of the individual layer,
   ii) spectral reflectance values at the interfaces of the individual layer,
   iii) spectral absorption values in a layer volume of the individual layer, and
   iv) spectral scattering values in the layer volume of the individual layer, c) ascertaining the expected spectral reflectance value by combining the values of each layer of the layer sequence which are computed in a) and b) and tracing a light path through the layer sequence from the uppermost layer to the bottommost layer and then reflected back from the bottommost layer through the uppermost layer wherein the resulting spectral reflectance value of said light is the expected spectral reflectance value of the layer system, and d) outputting the expected spectral reflectance value of the layer system.

2. Method according to claim 1, wherein tracing a light path through the layer sequence is a theoretical observation of a light beam impinging on a surface of the layer system and a course of the light beam through the individual layers and a remaining reflection.

3. Method according to claim 1, wherein the spectral transmission values, the spectral reflectance values, the spectral absorption values, and the spectral scattering values are computed as a function of a wavelength.

4. Method according to claim 1, wherein a foil is positioned as an uppermost layer of the layer system.

5. Method according to claim 1, wherein the layer system is positioned on white and/or black substrates when performing a) and b).

* * * * *